Jan. 27, 1925.　　　　　　　　　　　　　　　　　1,524,317
P. SCHON ET AL
FARM TRACTOR
Filed Feb. 13, 1918　　　　4 Sheets-Sheet 1
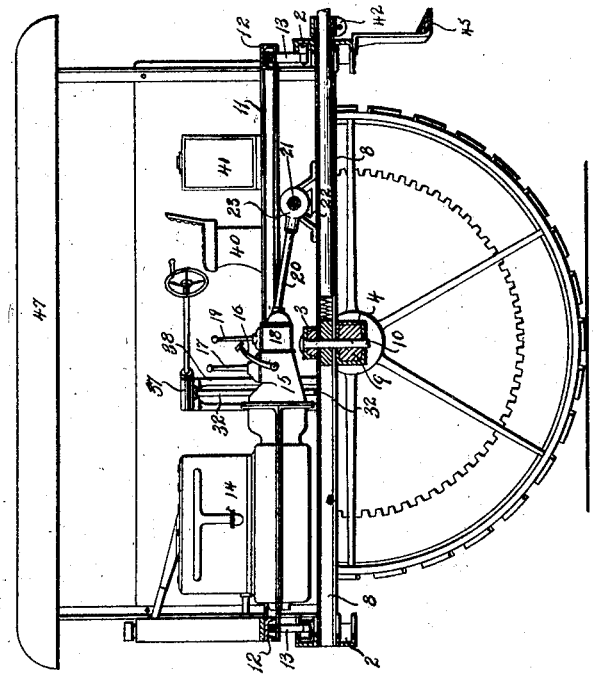
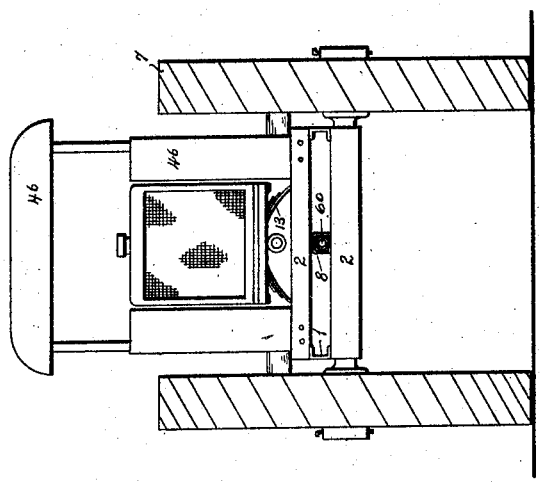
Inventors
Pierre Schon
James C Ledbetter
Attorney

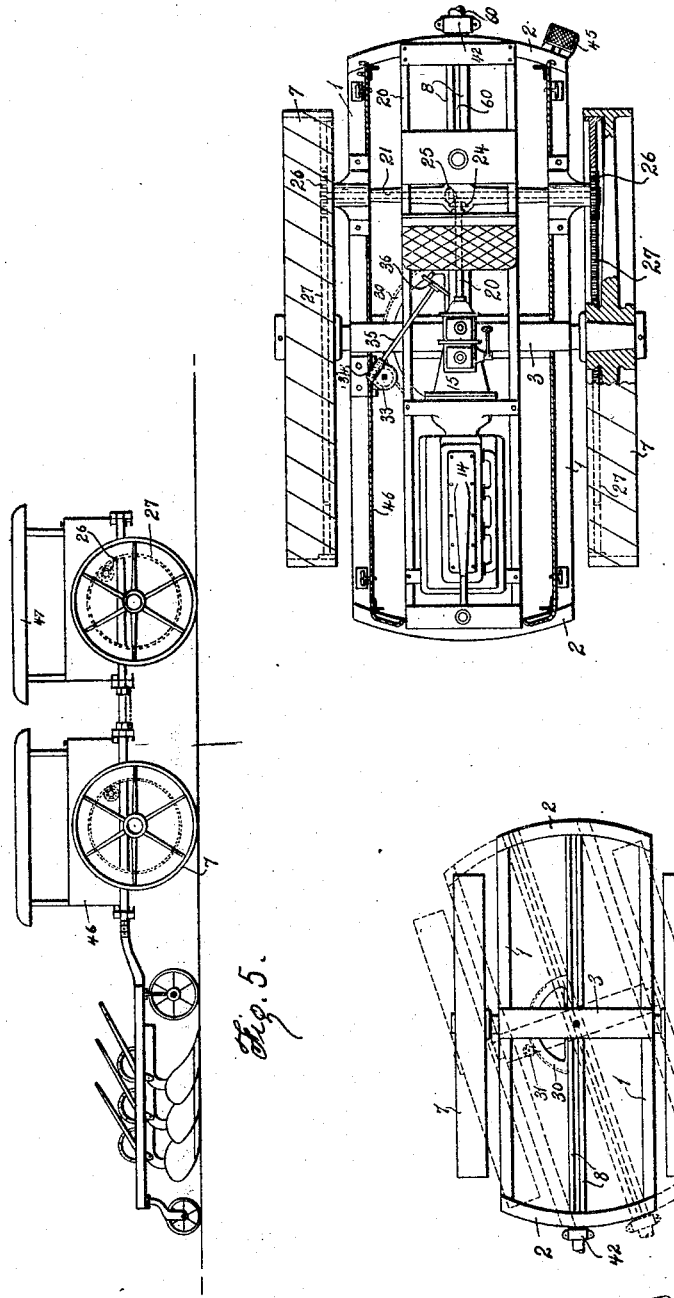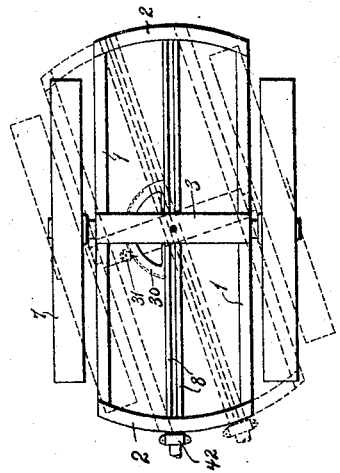

Jan. 27, 1925.

P. SCHON ET AL 1,524,317

FARM TRACTOR

Filed Feb. 13, 1918

Inventors
Pierre Schon
James C. Ledbetter

By
J. C. Ledbetter
Attorney

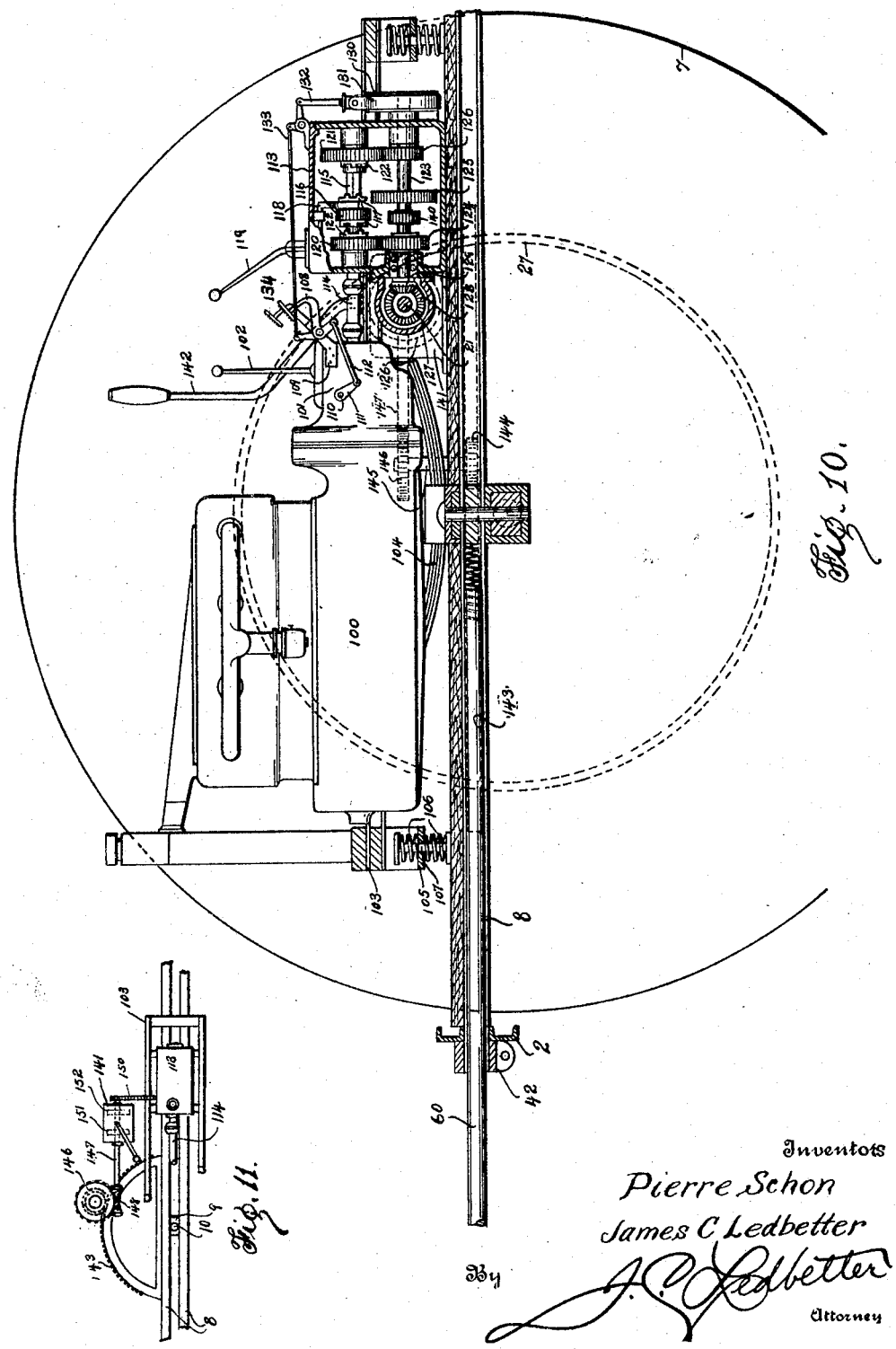

Patented Jan. 27, 1925.

1,524,317

UNITED STATES PATENT OFFICE.

PIERRE SCHON, OF DETROIT, MICHIGAN, AND JAMES C. LEDBETTER, OF BROOKLYN, NEW YORK; SAID LEDBETTER ASSIGNOR OF SIXTY PER CENT OF HIS ONE-HALF TO SAID SCHON.

FARM TRACTOR.

Application filed February 13, 1918. Serial No. 216,987.

*To all whom it may concern:*

Be it known that we, PIERRE SCHON, of Detroit, county of Wayne, State of Michigan, a subject of Marie Adelaide, Grand Duchess of Luxemburg, and JAMES C. LEDBETTER, of Brooklyn, New York, a citizen of the United States, have invented certain new and useful Improvements in a Farm Tractor, of which the following is a specification.

This invention relates to new improvements in farm tractors, and has particular relation to a certain two-wheel type of motor driven machine adaptable to all classes of farm work, both in the field and on the road for hauling purposes.

A purpose of the invention is to design and provide a farm tractor comprising a carriage with a pair of power driven tractor wheels, and make it possible to use this tractor in connection with a plow, wagon or any other form of agricultural implement to be operated on the farm.

The broad purpose of this invention is to take the modern conventional type gas engine unit power-plant with accessory axle which is common in truck and automobile connection, and adapt it to a light two wheeled farm tractor.

A particular purpose of the invention is to design a farm tractor for light draft work, which may be used in cultivating the crops in their early stage of growth.

It is still a further purpose to make a farm tractor with unit power-plant and transmission and associate therewith an auxiliary double gear reduction transmission which will provide the tractor with a broad variation of speeds, and engine power, which will make the machine a practical road tractor capable of making a speed up to fifteen and twenty miles, and also give it a slow speed of about two to seven miles an hour for field work.

Another purpose of this disclosure is to provide a tractor unit which may be coupled up with another unit, thus doubling the working capacity in the same practical way which a farmer does when he hitches in another horse or mule to work.

With the above and other objects in view, the invention has relation to a certain combination and arrangement of parts an example of which is given in the following specification, pointed out in the appended claims, and illustrated in the accompanying drawings, wherein, Figure 1 illustrates a side longitudinal sectional view of the farm tractor.

Figure 2 illustrates a front elevation of the machine.

Figure 3 shows a plan view of the tractor.

Figure 4 shows a plan view of the frame of the machine with said frame deflected in a steering position illustrated in dotted lines.

Figure 5 illustrates how two of these tractor units may be coupled together for heavy duty work.

Figure 10 is a view of a modified form of powerplant and transmission installation.

Figure 11 illustrates in plan view parts of a power steering mechanism which may be used in steering this machine where said machines are of such size as to render them impractical to steer by hand. This view is taken in connection with the Figure 10.

Figure 6:
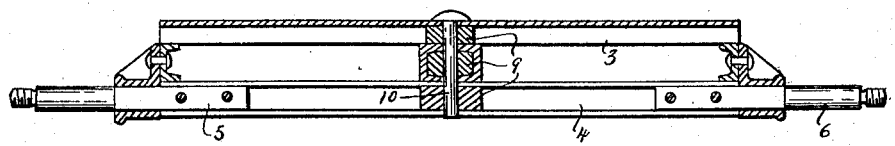
Figure 6 shows a detailed view of the main frame in cross section.

Referring now more in particular to the drawings wherein the same parts throughout are designated by the same reference characters, the numeral 1 points out two main frame members which extend the length of the machine and are held in spaced relation by arcuate frame pieces 2. The frames of the machine will preferably be constructed of standard channel iron or steel which will give the desired strength and rigidity for a farm tractor of durability and sturdiness in constant work. These frame members 2 are arranged in pairs at each extremity of the machine, one above and one below the main frame channels 1. A cross channel member 3 is mounted centrally in the frame. A pair of axle channels 4 carry steel spindles 5 fixed in the end thereof. The spindles are provided with bearings 6 to receive the traction wheels 7. A longitudinal pole strut comprising a pair of channels 8 extends the length of the machine. Central filler blocks 9 are riveted into the channels and receive a king-pin 10 which passes through all the filler blocks and establishes a pivotal relation of the pole strut with the main frame of the machine.

The power-plant and all accessory parts thereto are carried upon a spring suspended frame. This engine frame comprises a pair of parallel channel members 11 with the end cross pieces 12 suspended upon elliptical springs 13. These springs are shackled to the inner side of the frame pieces 2 and support the engine frame 11. In this way the engine is supported above the main frame of the machine upon the shock absorbing springs 13. A unit power-plant comprising a motor 14, with unit clutch and transmission 15, is carried directly upon the engine frame. A standard type radiator is mounted forward of the engine and upon the engine rails. This engine is provided with the usual clutch pedal 16 and gear shifting lever 17. An auxiliary gear reduction transmission 18 is bolted up with the standard type transmission. A gear shifting lever 19 controls the auxiliary transmission. A propeller shaft 20 connects up the power-plant with a main drive jack-shaft 21. This jack-shaft is mounted upon brackets 22 which support said jack-shaft slightly above the main frame of the machine. The jack-shaft is similar in design to a standard type automobile or truck axle and is provided with the differential housing 23. The plan view shows the propeller shaft in dotted lines and a drive pinion 24 meshing with a differential gearing 25 contained within the differential housing. The jack-shaft carries upon each extremity thereof a driving pinion 26 which engages an internal ring gear 27 carried within the traction wheels 7. The propeller shaft is fitted with universal joints which permit the desired flexibility between the power-plant and stationary jack-shaft.

A gear-sector 30 is fixed upon one of the pole struts 8 and has the king-pin as a center. A steering pinion 31 is provided and engages the gear-sector. A shaft 32 is journaled vertically with respect to the frame of the machine and carries the steering pinion 31 fixed upon the lower end thereof and is fitted with a worm wheel 33 at the top thereof to engage a worm 34. A steering column comprising a shaft 35 and hand wheel 36 connects with the worm and completes the steering mechanism of the tractor. The worm gear steering set is contained in a housing 37 supported above the main frame by the brackets 38. This gives the hand wheel a sufficient leverage over the gear-sector to rotate the machine as a whole about the king-pin as a center.

The auxiliary gear reduction transmission 18 may be included in the power-plant layout at any convenient point but preferably joined to the engine as illustrated. This transmission comprises a two-speed power distributing means provided with a neutral direct drive. When this transmission is in neutral, or driving in direct, it serves only as a link in the propeller shaft. Then under extreme pulling conditions or where heavy plowing is being done this low gear reduction may be brought into use by shifting the lever 19, which doubles the propeller shaft speed since said auxiliary transmission contains a double gear reduction element designed to cut down the speed of the propeller shaft one half the crank shaft speed of the engine. Likewise the auxiliary transmission contains one other gear which may be engaged to double the speed of the propeller shaft with the crank-shaft speed of the engine. In this last operation more ground speed of the tractor would be gained. This auxiliary transmission will be found very convenient in use where the tractor is used upon good roads for haulage purposes and in making trips back and forth to town. In this latter case a solid rubber tire road tread can be slipped upon the face of the tractor wheels for adapting the machine to road work. The auxiliary transmission will be further explained in connection with the modified view.

A driver's seat 40 is provided and preferably mounted upon the engine frame. A gas tank 41 may be carried upon the frame along with the starting battery, tools box and other accessories which may be convenient to furnish with a tractor of this type.

The pole strut 8 projects from one end of the machine and is fitted with a substantially heavy clip 42 which will have a hole formed therein for receiving a heavy chain or coupling means for coupling to plows or other implements to be drawn by the tractor.

A step 45 is provided at the rear of the machine for the driver's convenience in getting into the tractor. The tractor is provided with a metal body 46 extending from the rear of the machine to the front thereof and adjacent the radiator. The rear of the machine is left open. A top 47 is provided and may be arranged to be let down over the body and completely cover the power-plant and parts when not in use.

The present design of tractor is the result of the application of conventional standard products to farm tractor machines. The entire power-plant and jack-shaft layout gives a simplicity of construction which will make a tractor of this type very practical, and can be driven by any automobile operator and is reliable and positive, and highly adaptable for farm work.

Fig. 10 illustrates a modified form of the unit power-plant and correlated auxiliary double gear reduction of transmission assembly which may be used in steering this machine. This construction is designed to occupy a minimum space and will be quick and convenient in the installation, and removal thereof in case it is desired to replace parts, and gives a construction which is very accessible.

The unit power-plant comprising the engine 100, transmission 101, and gear shifting lever 102 is carried upon an engine frame 103, which occupies less length space than in the other engine mounting. This frame is spring suspended and shows a single pair of elliptic springs 104 centrally mounted beneath the frame, and arranged parallel thereto. At each end of the engine frame is arranged a bracket 105 which is attached to the underneath side thereof and provided with a pair of coiled cushion springs 106 disposed upon each side of the bracket, and confined upon a rod 107 placed to hold said springs in position. This spring cushion set is carried upon each end of the frame and adapted to balance it and take up any rocking motion which might be exerted throughout the frame, while the spring set 104 carries the weight of the power-plant.

A clutch pedal 108 is mounted forward of the transmission set and carried upon a bracket 109. The clutch actuating shaft projects from the case of the transmission. An arm 111 is fixed upon said shaft 110 and connected through a link 112 with the clutch releasing pedal 108. This establishes direct control over the clutch through the pedal and enables the operator to effectively engage or disengage the clutch.

Substantially the same form of auxiliary or double gear reduction transmission is employed in this modified form as in the original design and shows the transmission case 113 arranged adjacent the engine and connected therewith through the propeller shaft 114 which is fitted with the necessary universal joints. The propeller shaft will be used as a short coupling between the engine and auxiliary transmission in order to bring close together all parts of the power-plant. The propeller shaft connects directly with the main shaft 115 of the transmission. The central portion of this is splined or formed square and carries upon the spline a sliding gear 116 which has upon each side thereof a dog clutch 117 forming a part of the gear. This sliding gear is controlled by a shifting yoke 118 connected up with the gear shift lever 119. In this manner the sliding gear may be shifted back and forth upon the spline, as in the conventional type of transmission. Each extremity of this main shaft 115 is formed with a journal which turns in bearings carried in the housing. Gears 120 and 121 are fitted with bushings and carried on the journals. The gears 120 and 121 are provided with a dog clutch 122 designed to engage with the clutch 117 of the sliding gear. By proper manipulation of the gear shifting lever 119 the sliding gear may be brought into engagement with either the gear 120 or gear 121. The gear selected to be engaged with the sliding gear couples up therewith through the clutch thereby locking this gear upon the main shaft 115; for example if it is desired to lock gear 121 with the shaft, the gear shifting lever is brought rearwardly which carries the gear 116 forward on the spline until the clutches 117 and 122 have engaged, thus locking the gear 121 with the gear 116 and fixing it to turn positively with the main shaft. A countershaft 123 is journaled in the lower portion of the transmission case and has fixed thereupon the several gears 124, 125, and 126. The gears 121 and 126 are constantly engaged and nonshiftable, likewise the gears 120 and 124. The two gears 120 and 124 are of the same diameter, which means that the countershaft 123 will be driven the same speed as the crank-shaft of the motor. This may be termed the direct drive, since driving through the main gears 120 and 124 does not vary the speed of this countershaft. This places the countershaft under the speed control of the unit transmission 101, and subjects it to the variations in revolutions obtained by the use of said unit transmission which, as heretofore explained, is of the conventional three speed type, and not illustrated in detail in these drawings. The gear 116 will be half the diameter of the gear 125, or of any suitable size to give the desired gear reduction. In this particular instance the one half gear reduction is shown between the two, but they may be made any suitable diameter under the scope of this patent. When the sliding gear 116 is shifted forward and engaged with the gear 125 the countershaft of the transmission is then driven one half of the engine speed, and in this way a very great power output from the engine can be realized upon the countershaft. When the sliding gear is shifted still farther and engaged with the gear 121, locking it upon the main shaft, the countershaft is driven twice the speed of the engine since the gear 126 is half the diameter, or approximately so, of the size of the gear 121.

A differential housing 127 is bolted up with the transmission housing and carries a master gear 128 and a driving pinion 129.

The driving pinion is fixed upon the counter shaft and constantly engages the master gear. The main drive jack-shaft 21 extends from the master gear to each side of the machine where it is fixed to the main driving pinion 26, engaged with the internal ring gear 27, of the tractor wheel 7.

The countershaft 123 is extended beyond the housing and fitted with a brake drum 130, and provided with a brake band 131 and brake rod connection parts 132 and 133, and connected up with the brake pedal 134. In this way the driver has a breaking or retarding control over the machine through the use of the brake pedal 134 which places a frictional load upon the countershaft of the transmission.

A gear 140 is fixed upon the countershaft as a power take-off to drive the steering transmission which has been heretofore mentioned. In this view the steering transmission 141 is shown behind the transmission case and provided with a steering lever 142 which stands convenient the driver's seat to be provided upon the spring suspended engine frame. The large gear-sector fixed to the pole strut is here designated by the numeral 143. The steering pinion 144 meshes with the gear sector, and is carried upon the vertical shaft 146 which in turn is fixed in the worm wheel 146. The steering shaft 147 leads from the steering transmission and carries a worm gear 148 which meshes with, and turns the worm wheel forward or backward to steer the machine to right or left as previously described.

Figure 7:
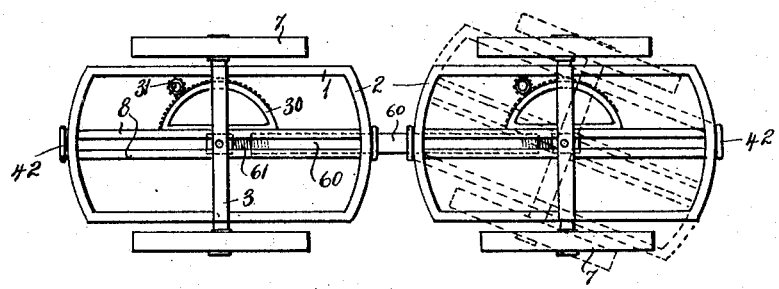
Figure 7 shows a plan view of two of the tractor frames coupled together and illustrating how one of the units is leading the other in a turn.
Figure 8:
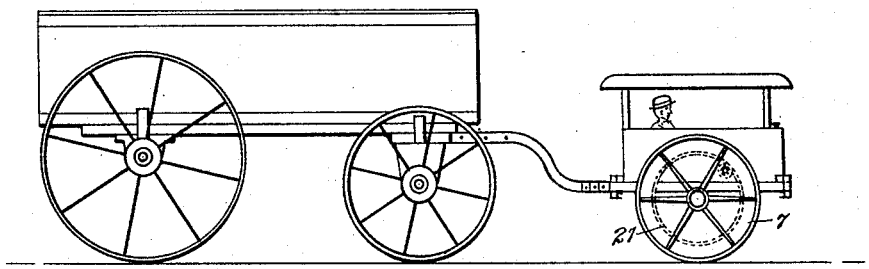
Figure 8 shows the tractor doing road work and hauling a wagon.
Figure 9:
Figure 9 shows a coupling pole used in joining up two or more tractor units.

As previously mentioned it will be practical to couple up two of these tractor units in order to gain great pulling power. Figure 7 illustrates the bare frame of two units joined together. This plan view shows how one of the sections or units acts as the guiding or steering unit for the following machine and shows in dotted lines the frame and wheels deflected in a right-hand turn, the pole strut 60 acting as a backbone for the two sections and causing the whole body and wheel set of the steering unit to revolve about the king-pin as a center, while the pole coupling and main frame remain stationary. It is also possible for the steering mechanism of each unit to be brought into operation simultaneously one with the other in order to make very short turns. The pole coupling is shown in detail in Figure 9 and seen to be provided with a heavy buffer spring 61 confined in each extremity thereof and backed up by a wood filler 62. This filler makes the tubular pole coupling very stiff and strong. In coupling up two tractor units to pull together, the pole is placed in the pivoted pole strut of each unit with the buffer springs in compression against the filler blocks 9, and a chain 63 fastened between the tractors. This couples up the two units so as to pull together, yet insures against any jar between the two. This arrangement is brought out in Figures 5 and 7.

Either a mechanical or manual steering means may be incorporated in this machine. These drawings show both types. In Figure 10 the steering transmission is behind the several other parts, and in Figure 11 the power steering mechanism is shown in plan view, and a description of the assembly of same having been in part given above. A chain or other suitable form of drive 150 drives the special planetary steering transmission which is provided with two friction drums 151 and 152 carried upon the steering shaft 147. The hand steering lever 142 is shifted to the right and left to select either one friction drum or the other in controlling the turning direction of the steering shaft 147. The power steering transmission set gives quick and positive movement to the machine and when the lever is moved in engagement with the drum selected for a right or left hand turn, the steering shaft immediately subjects the worm wheel and steering pinion to movement in the desired direction. When the lever is released by the driver it releases the steering shaft and the machine continues in the direction which it had at the instant the steering lever was returned to neutral. Two tractor units may be steered together or separately as desired since each unit is independent in its operation yet co-operates with its companion tractor in deriving horizontal support.

The invention is presented to include all such changes and modifications in design and use as may come within the meaning of the following claims.

Claims:

1. A tractor machine comprising two frames, a pole joining the frames together in spaced relation whereby either one or both frames may pivotally swing on the pole, a spring cushion adapted to co-operate with the pole by which the shock or thrust of the frames is absorbed, an engine carried on each frame, a pair of tractor wheels carried on each frame and driven by the engine, and a coupling adapted to anchor both frames together on the pole and up against the cushion.

2. A tractor machine comprising a plurality of separate power units, each unit consisting of a main frame, an axel rigidly mounted on each frame, a pair of tractor wheels carried on the axle, an engine on each frame to drive the tractor wheels, a single pole strut pivotally confined in each main frame, a spacing member carried on the pole strut adapted to maintain them in a spaced and supported relation one with the other.

3. In a farm power machine of the tractor type comprising separate power units, each unit consisting of a main frame, an axle rigidly mounted with respect to each frame, a pair of tractor wheels carried on the axle, an engine carried on each unit to drive each set of tractor wheels, a pole strut pivotally confined in the two main frames, a projecting extremity made on each pole strut used as a connecting attachment with the other unit, a connecting member fixed on each projecting extremity of the pole strut to maintain the units in spaced and supported relation one with the other, and a steering means correlated with each unit adapting the frame and tractor wheels of each unit to be revolved about the pole strut to independently steer the connected units.

4. In a tractor machine, the combination with an axle journaling a pair of power driven tractor wheels, a frame rigidly mounted upon the axle, a pole strut pivoted in the frame with each end thereof confined in a guide-way, frame pieces formed on a radius from the pole strut pivot as a center to provide the aforesaid guide-way for the pole strut, and provision for providing the machine with suitable control, driving means, and steering means.

5. A multiple tractor machine consisting of a suitable number of self-propelled steerable units, each unit comprising a frame, a draft pole connecting the number of units and pivoted on each frame, and a shock absorber forming a part of the draft pole to equalize the propelling power of the connected units.

6. A combination multiple tractor machine consisting of connected power units, each unit comprising a frame, a set of tractor wheels carried by each frame, an engine carried on each frame to drive the wheels, a swingable member pivoted at its center in the center of the frame of each unit with its ends terminating adjacent each end of the frame, a spacing member carried by the swingable member of each unit to connect up the two independent tractor units, and a cushion means carried by the spacing member to facilitate connecting the tractor with an implement.

In testimony whereof we hereunto set our hands at Detroit, in the county of Wayne and State of Michigan, this sixth day of February, A. D. 1918.

PIERRE SCHON.
JAMES C. LEDBETTER.